(12) United States Patent
Agnew

(10) Patent No.: US 12,409,901 B2
(45) Date of Patent: Sep. 9, 2025

(54) CONVERSION OF A POWER MACHINE BETWEEN WHEELED AND ENDLESS TRACK TRACTIVE ELEMENTS

(71) Applicant: Doosan Bobcat North America, Inc., West Fargo, ND (US)

(72) Inventor: Dennis Agnew, Moffit, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 828 days.

(21) Appl. No.: 17/613,562

(22) PCT Filed: May 26, 2020

(86) PCT No.: PCT/US2020/034523
§ 371 (c)(1),
(2) Date: Nov. 23, 2021

(87) PCT Pub. No.: WO2020/243079
PCT Pub. Date: Dec. 3, 2020

(65) Prior Publication Data
US 2022/0242501 A1 Aug. 4, 2022

Related U.S. Application Data

(60) Provisional application No. 62/852,709, filed on May 24, 2019.

(51) Int. Cl.
*B62D 55/084* (2006.01)
*B62D 55/04* (2006.01)
(Continued)

(52) U.S. Cl.
CPC .......... *B62D 55/084* (2013.01); *B62D 55/04* (2013.01); *B62D 55/065* (2013.01); *B62D 55/13* (2013.01)

(58) Field of Classification Search
CPC .... B62D 55/084; B62D 55/04; B62D 55/065; B62D 55/13
See application file for complete search history.

(56) References Cited

U.S. PATENT DOCUMENTS 3,106,101 A 10/1963 Harriman
4,964,842 A 10/1990 Howard
(Continued)

FOREIGN PATENT DOCUMENTS

JP H10129544 A 5/1998
JP 2016037075 A 3/2016
(Continued)

OTHER PUBLICATIONS

PCT International Search Report and Written Opinion, PCT/US2020/034523, Aug. 28, 2020, 14 pages.
(Continued)

*Primary Examiner* — Valentin Neacsu
*Assistant Examiner* — Michael R Stabley
(74) *Attorney, Agent, or Firm* — Quarles & Brady LLP

(57) ABSTRACT

A kit and corresponding method can be used to convert wheels of a power machine to track assemblies, such as to convert a four-wheeled power machine to a quad track power machine. A stub shaft (346) can be secured to an axle (328) of a power machine (300) and can be configured to support a track frame (366) of a track assembly in place of a wheel (319). A bearing (368) can be secured to the stub shaft (346) and a bushing (376) can engage the axle (328) to rotatably support the track assembly relative to the axle (328). Pieces of a segmented sprocket (378, 380) can be separately secured to a hub (306) of a power machine (300) to help install and drive a track of a track assembly.

19 Claims, 9 Drawing Sheets

(51) Int. Cl.
  *B62D 55/065* (2006.01)
  *B62D 55/13* (2006.01)

(56) References Cited

U.S. PATENT DOCUMENTS

| | | | |
|---|---|---|---|
| 5,316,522 A | 5/1994 | Carbone et al. | |
| 5,607,210 A | 3/1997 | Brazier | |
| 5,833,562 A | 11/1998 | Walker, Sr. | |
| 5,842,757 A * | 12/1998 | Kelderman | B62D 55/14 |
| | | | 305/132 |
| 6,006,847 A | 12/1999 | Knight | |
| 6,074,316 A | 6/2000 | Murrietta, Sr. | |
| 7,712,557 B2 * | 5/2010 | Duceppe | B62D 55/084 |
| | | | 180/9.3 |
| 8,672,064 B2 * | 3/2014 | Korus | B62D 55/12 |
| | | | 180/9.26 |
| 8,801,115 B2 * | 8/2014 | Hansen | B62D 49/0635 |
| | | | 180/9.26 |
| 9,097,332 B2 | 8/2015 | Li et al. | |
| 9,586,634 B2 * | 3/2017 | Buchanan | B62D 55/10 |
| 9,643,667 B2 * | 5/2017 | Hansen | B62D 55/04 |
| 9,656,703 B2 * | 5/2017 | Zuchoski | B60W 50/082 |
| 9,676,430 B2 * | 6/2017 | Mattson | B62D 55/084 |
| 9,902,441 B2 * | 2/2018 | Buchanan | B62D 55/10 |
| 10,399,618 B2 * | 9/2019 | Brazier | B62D 55/10 |
| 2007/0161443 A1 | 7/2007 | Krisl | |
| 2013/0038119 A1 * | 2/2013 | Griffith | B62D 55/13 |
| | | | 29/525.01 |
| 2016/0075384 A1 | 3/2016 | Mattson | |
| 2021/0148446 A1 | 5/2021 | Todderud et al. | |

FOREIGN PATENT DOCUMENTS

| | | |
|---|---|---|
| WO | 2009033052 A1 | 3/2009 |
| WO | 2019014757 A1 | 1/2019 |

OTHER PUBLICATIONS

China National Intellectual Property Administration, The Second Office Action for corresponding CN Application No. 202080038358.7, issued Jun. 21, 2024.

* cited by examiner

CONVERSION OF A POWER MACHINE BETWEEN WHEELED AND ENDLESS TRACK TRACTIVE ELEMENTS

CROSS-REFERENCE TO RELATED APPLICATIONS

This application claims priority to U.S. Patent Application No. 62/852,709 filed May 24, 2019, which is hereby incorporated by reference in its entirety.

BACKGROUND

This disclosure is directed toward power machines. More particularly, this disclosure relates to conversion of power machines between configurations with different types of tractive elements, including conversion of wheeled power machines to tracked power machines, or more particularly still to convert the power machine from using wheeled tractive elements to those with endless tracks. Power machines, for the purposes of this disclosure, include any type of machine that generates power to accomplish a particular task or a variety of tasks. One type of power machine is a work vehicle, Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines can include different tractive elements to allow movement across terrain or other support surfaces. For example, some power machines include tracked tractive assemblies with ground-engaging endless tracks and others include wheeled tractive assemblies with ground-engaging wheels. The relative utility of endless tracks versus wheels as tractive elements may vary depending on the particular support surface, the operator, other aspects of the configuration of the relevant power machines, the operations to be executed, and various other factors.

The discussion above is merely provided for general background information and is not intended to be used as an aid in determining the scope of the claimed subject matter.

SUMMARY

Embodiments of the disclosed subject matter can allow operators to easily convert wheeled power machines to tracked power machines, such as by replacing each of four wheels of a power machine with a respective track assembly to convert the four-wheeled power machine into a quad track power machine.

Some embodiments provide a kit for converting a wheeled power machine to a tracked power machine, the wheeled power machine including an axle, a hub supported by the axle, and a wheel secured to the hub. The kit can include a stub shaft, a track frame, and a sprocket. The stub shaft can be configured to be secured at an outboard end of the axle. The track frame can be configured to be operably coupled to the axle at the stub shaft. The sprocket can be configured to be secured to the hub in place of the wheel to move a track about the track frame upon rotation of the axle.

Some embodiments provide a kit for converting a wheeled power machine to a tracked power machine. The wheeled power machine can include an axle, a hub supported by the axle, a wheel secured to the hub, and an end cap secured to fastener holes at an outboard end of the axle, and a track frame can be provided to replace the wheel. The kit can include a stub shaft that is configured to be secured at the fastener holes at the outboard end of the axle in place of the end cap. The stub shaft can be further configured to rotatably support the track frame relative to the axle.

Some embodiments provide a segmented sprocket for transferring rotational power from a hub of an axle of a power machine to an endless track or track, for simplicity's sake. The segmented sprocket can include at least three sprocket pieces that are configured to collectively define a substantially circular sprocket profile. The at least three sprocket pieces can be configured to be separately secured to the hub to be engaged with track.

Some embodiments provide a method of converting a power machine from using wheeled tractive elements to tractive elements that each include an endless track. A wheel can be removed from a hub of an axle of the wheeled power machine. A stub shaft can be attached to the outboard end of the axle. A track frame can be rotatably secured to the stub shaft. A track can be aligned on the track frame. A sprocket can be attached to the hub. The hub can be rotated to tension the track with the sprocket.

Some embodiments provide a method of converting a wheeled power machine to a tracked power machine. A first sprocket piece of a segmented sprocket can be secured to a hub of the wheeled power machine. A track can be placed in alignment with the first sprocket piece. The hub can be rotated to tension the track with the first sprocket piece. After tensioning the track with the first sprocket piece, second and third sprocket pieces of the segmented sprocket can be secured to the hub.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

DETAILED DESCRIPTION

Figure 1:
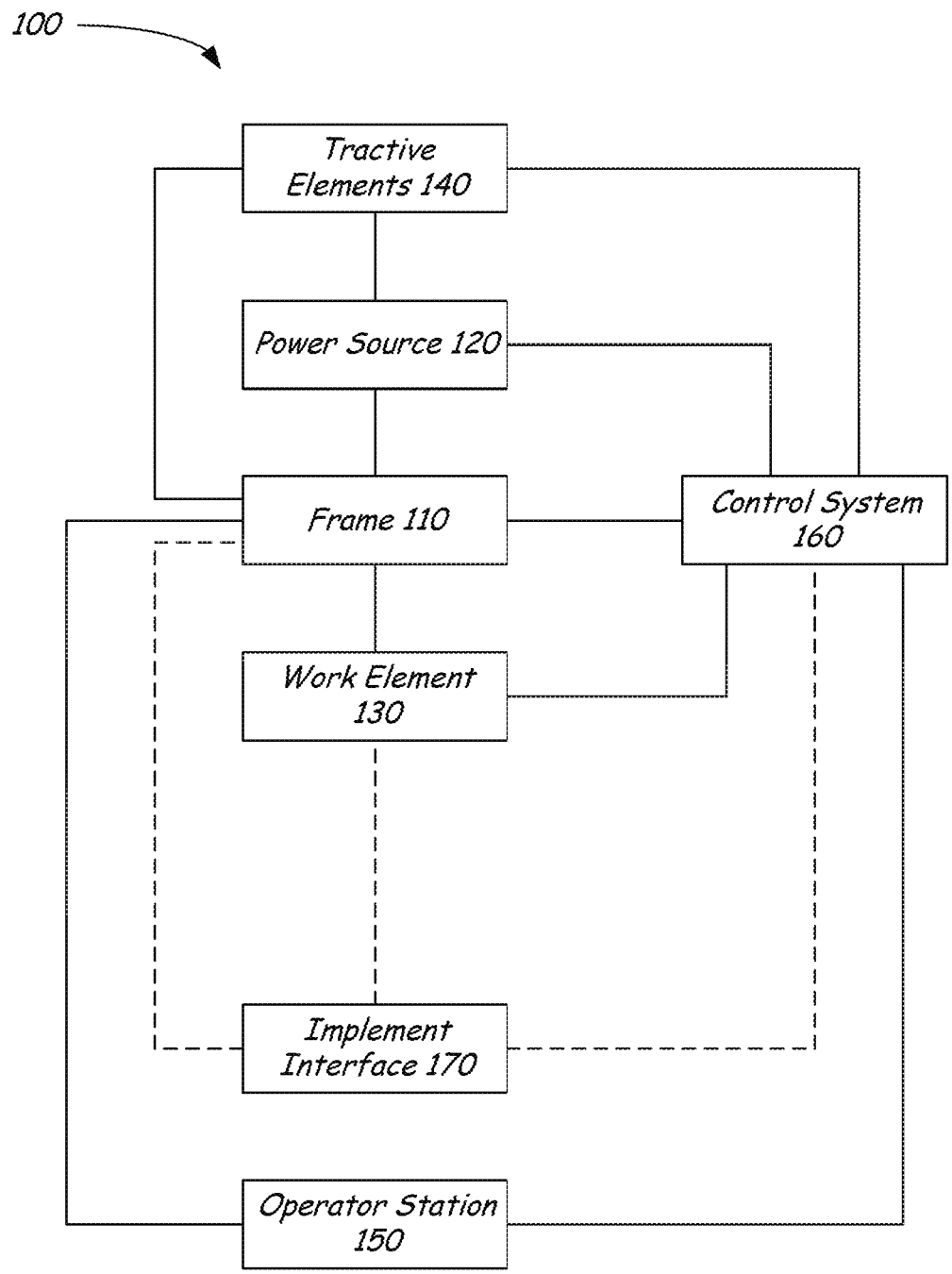
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

With conventional designs, a power machine equipped with wheels may require substantial reconfiguration to replace the wheels with tracks, and vice versa. Accordingly, for conventional designs, it is generally not practically or economically possible to convert any given power machine between tracked and wheeled operation. However, due to the relative advantages of wheels and tracks for different contexts, operators could potentially derive substantial benefits from conversion of particular machines between wheeled and tracked tractive elements.

Some of the embodiments disclosed herein can address these and other needs. For example, some embodiments can include a kit and a corresponding method for converting tractive elements of a variety of power machines from wheeled to tracked configurations. In this way, for example, a four-wheeled power machine can be converted to a quad track power machine, with a track assembly replacing each of the four wheels. Likewise, a corresponding kit and method according to some embodiments can be used to convert tractive elements from tracked to wheeled configurations, such as may allow conversion of a quad track power machine to a four-wheeled power machine.

In some embodiments, a kit to replace a wheel of a power machine with a track assembly can include a stub shaft that is configured to replace an end cap of an axle that supports wheel. The stub shaft can also be configured to support a track frame, such as by receiving a bearing that is secured to the track frame. Accordingly, with the wheel removed from the corresponding hub and the stub shaft secured to the axle, a track assembly can be fitted on the axle, such as by mounting a bearing for the track assembly onto the stub shaft and a bushing for the track assembly onto the corresponding axle tube. Accordingly, the track frame and a track supported thereon can pivot relative to the axle, as supported by the bearing and the bushing. In some embodiments, a pillow bearing can be used, with a mounting block secured to a track frame, and a bushing can be partly integrally formed with the track frame. In other embodiments, however, other types of bearings (or bushings) can be used.

In some embodiments, a kit to replace a wheel of a power machine can also include a segmented sprocket (i.e., a sprocket formed from multiple separately-installable pieces). As discussed above, for example, a stub shaft can allow a track frame to be mounted on an axle in place of a wheel. Generally, the track frame can be mounted on the axle using the stub shaft, with a bearing and a bushing to support the track frame being disposed on opposing sides of a hub of the axle (e.g., with the hub disposed laterally within the track frame). Subsequently, at least one piece of the segmented sprocket can be secured to the hub. A track can be installed onto the track frame in alignment with the installed piece(s) of the segmented sprocket, and the sprocket piece(s) can be rotated with the hub to engage and tension the track. With the track thus engaged to maintain clearance relative to the hub, the remaining sprocket piece(s) can then be installed on the hub to complete the segmented sprocket. Accordingly, during operation, the track can be driven around the track frame by rotation of the hub and the entire segmented sprocket.

In some embodiments, use of a segmented sprocket can substantially improve the ease of installation of a track onto a track frame. For example, due to the need to align and tension a track with a sprocket, installation of a fully circular single-piece sprocket can be difficult. In contrast, even with a track installed in alignment with a relevant hub, a piece of a segmented sprocket can be installed relatively easily onto the hub, such as at mounting locations on the hub that are opposite any contact with the track. The installed piece of the segmented sprocket can then be used to tension the track, via rotation of the hub, so that substantial clearance is provided to subsequently install the remaining sprocket pieces.

In some embodiments, it may be particularly advantageous to form a complete circular profile of a segmented sprocket from at least three separate sprocket pieces, such as one semi-circular sprocket piece and two quarter-circular sprocket pieces. In an example installation of these pieces, once a track frame has been installed on an axle the semi-circular sprocket piece can be installed onto a hub of an axle (e.g., on a bottom half of the hub) and a track fitted over the track frame and the semi-circular sprocket piece. The hub and the semi-circular sprocket piece can then be rotated together to engage and tension the track relative to the track frame. With the track thus engaged, the two quarter-circular sprocket pieces can then be relatively easily installed onto the hub (e.g., also on the bottom half of the hub), so that the installed segmented sprocket provides a substantially complete circular profile to transmit rotational power from the hub to the track. In many installations, similar benefits can also be obtained with other segmented sprockets, including segmented sprockets with three substantially identical (e.g., third-circular) sprocket pieces, four substantially identical (e.g., quarter-circular) sprocket pieces, or other configurations.

Figure 2:
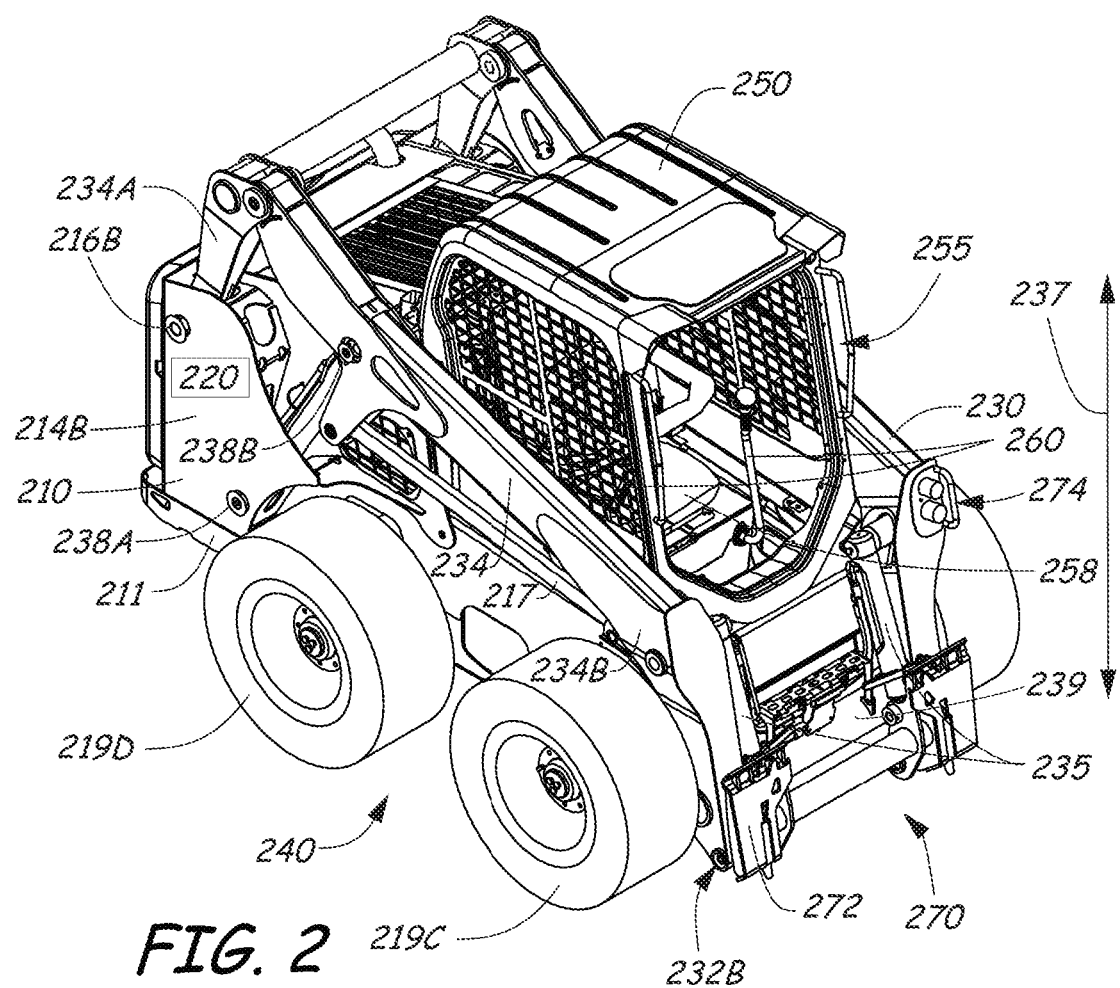
FIGS. 2-3 illustrate perspective views of a representative power machine in the form of a skid-steer loader of the type on which the disclosed embodiments can be practiced.
Figure 3:
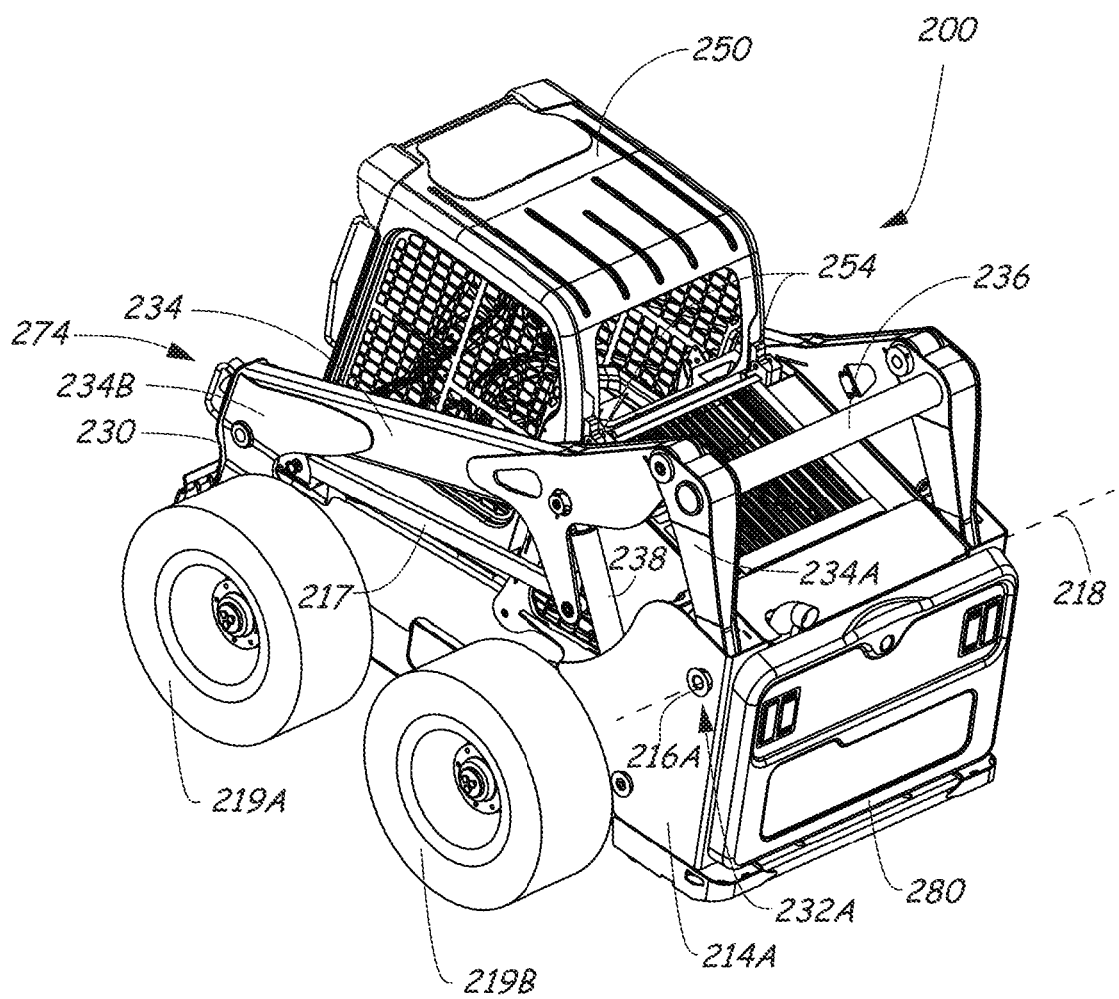

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power. Some embodiments disclosed herein can be practiced particularly advantageously on wheeled power machines that include axles with removable end caps, although some embodiments may not require such a configuration.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced, Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
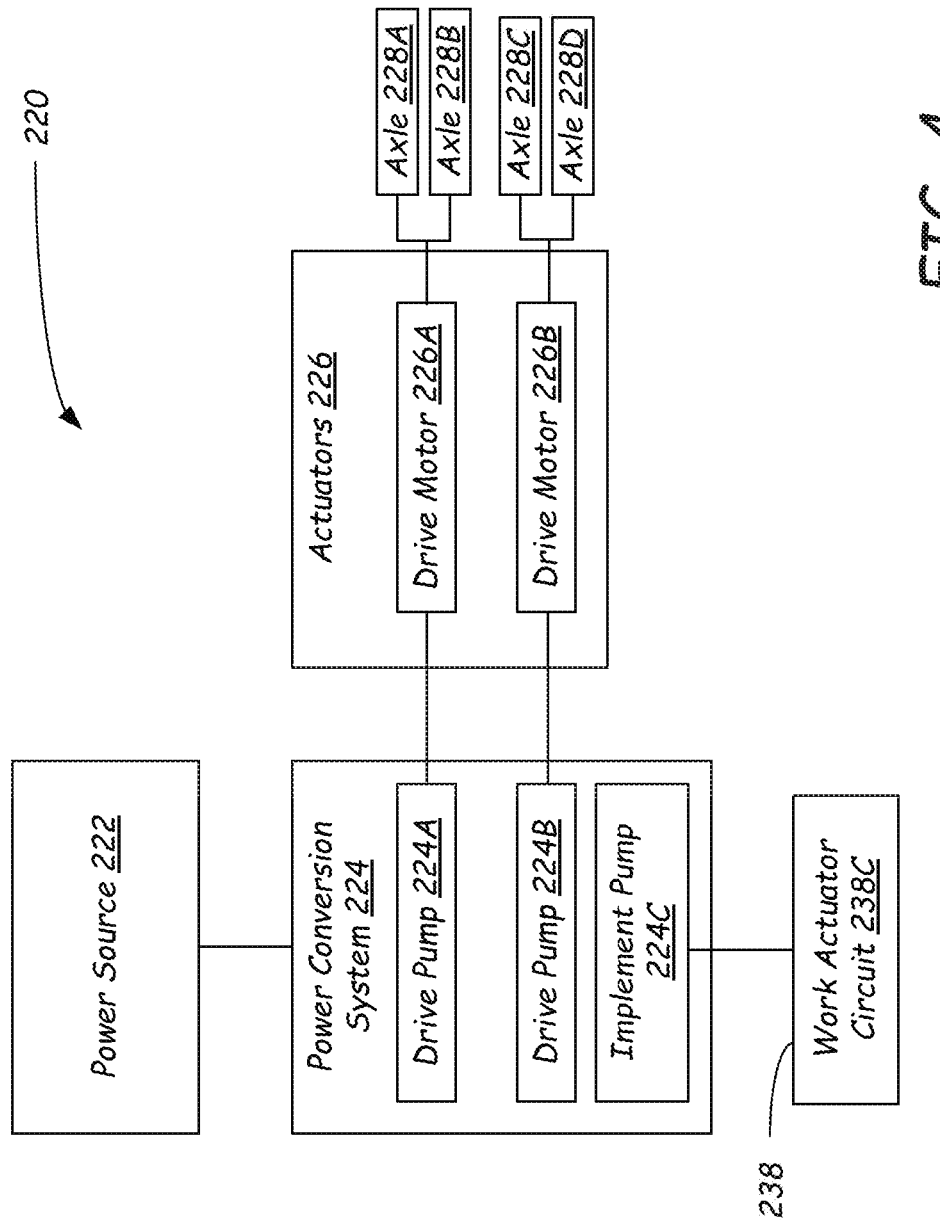
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 2280 and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 2240, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3-spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as loader 200, unless otherwise noted or recited, the concepts discussed below are not intended to be limited in their application to the environments specifically described above.

Figure 5:
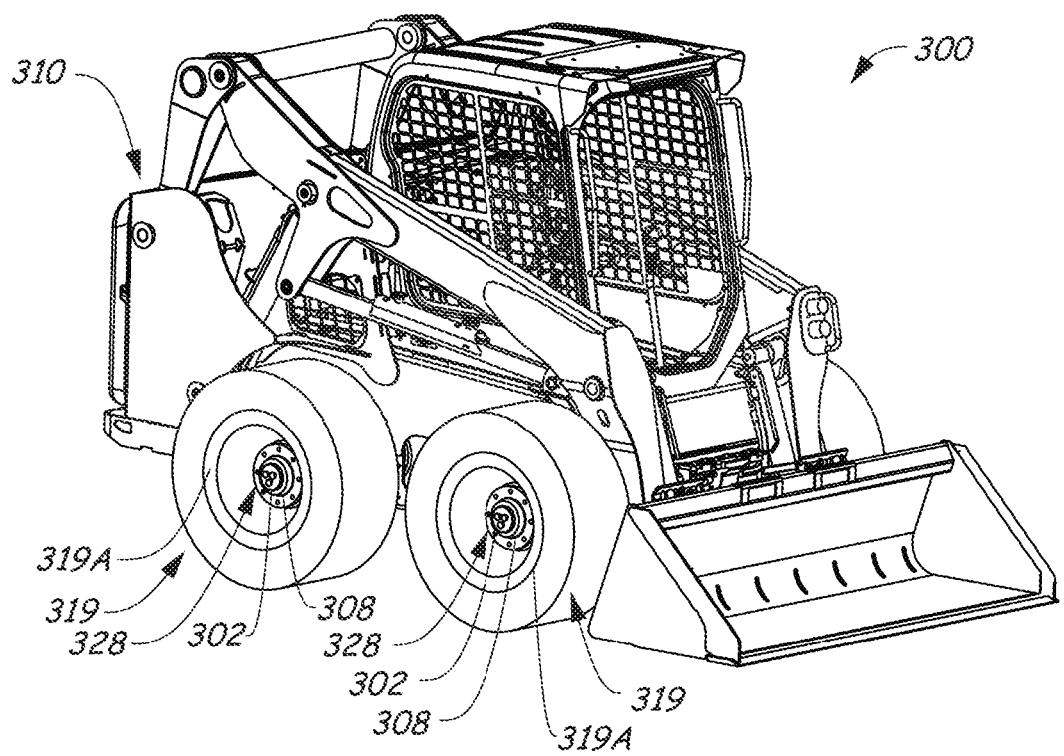
FIG. 5 illustrates a perspective view of a representative power machine in the form of a wheeled skid-steer loader of the type on which the disclosed embodiments can be practiced.

FIG. 5 illustrates a loader 300, which is one particular example of a power machine of the type illustrated in FIG. 1 where the embodiments discussed below can be advantageously employed. Similar to the loader 200, the loader 300 should not be considered limiting especially as to the description of features that loader 200 that are not essential to the disclosed embodiments and thus may or may not be included in power machines other than loader 300 upon which the embodiments disclosed below may be advantageously practiced. Unless specifically noted otherwise, embodiments disclosed below can be practiced on a variety of power machines, with the loader 300 being only one of those power machines. For example, some or all of the concepts discussed below can be practiced on many other types of work vehicles such as various other wheeled loaders, excavators, trenchers, and dozers, to name but a few examples.

Figure 6:
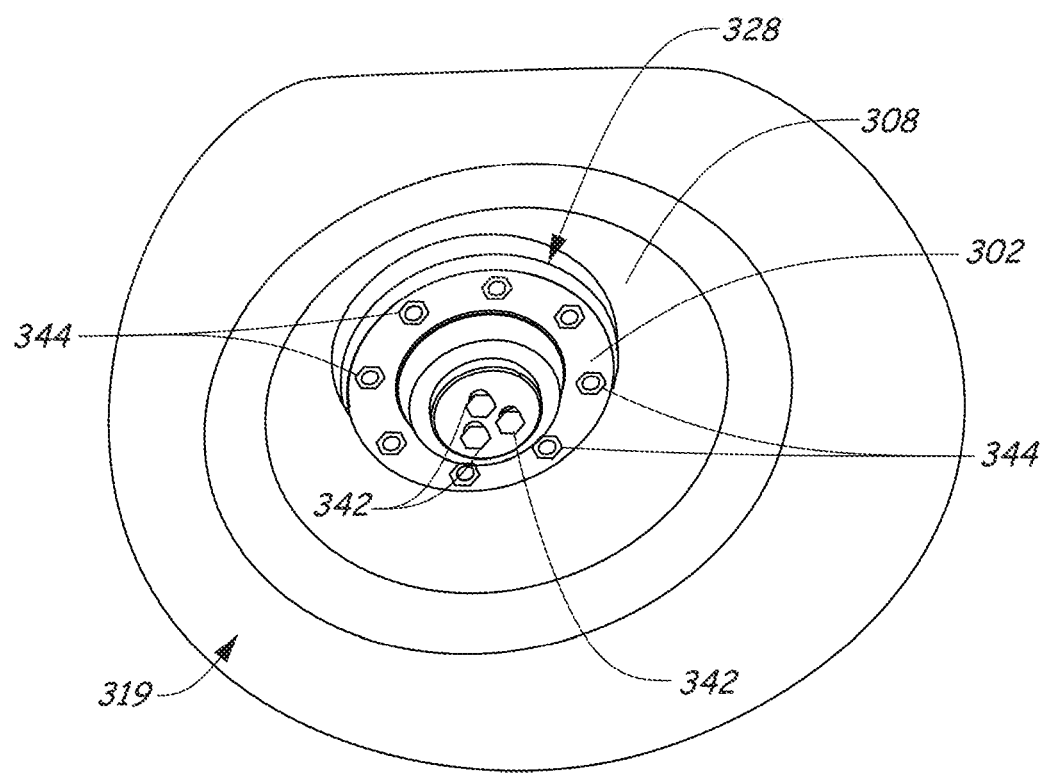
FIG. 6 illustrates a perspective partial view of a wheel assembly of the power machine of FIG. 5.
Figure 9:
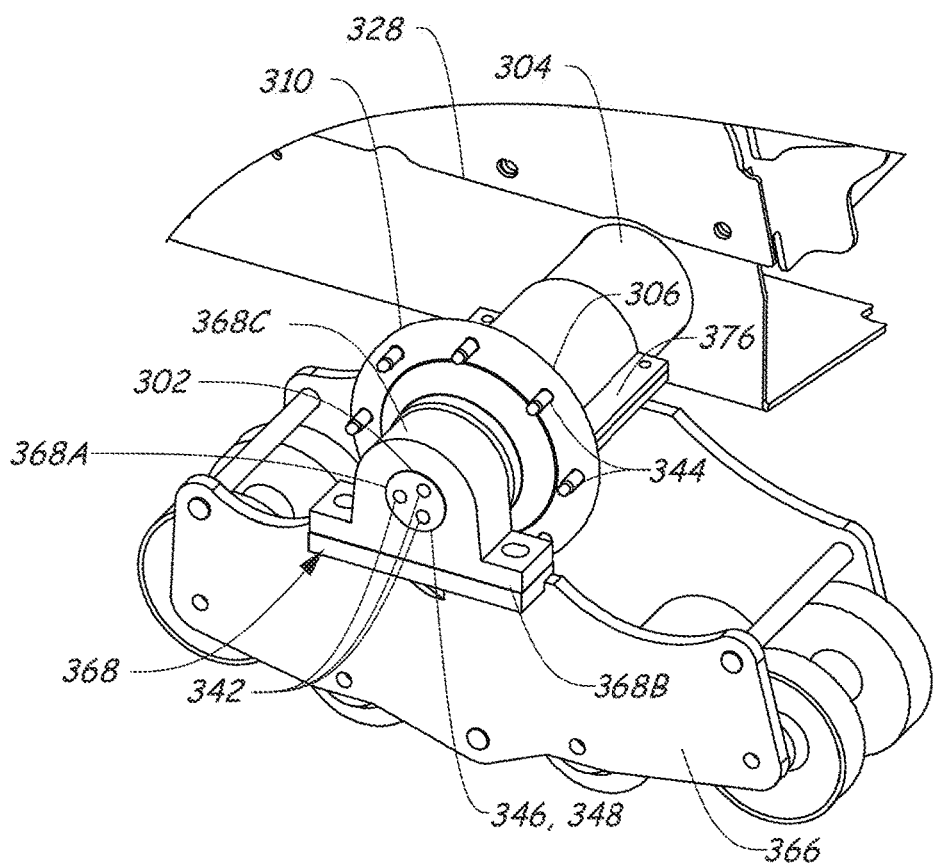
FIG. 9 illustrates a perspective view of certain components of a track assembly assembled onto an axle of the power machine of FIG. 5.

The loader 300 is a skid-steer loader generally similar to the skid-steer loader 200 discussed above, with tractive elements configured as four wheels 319 that are mounted to a frame 310 of the loader 300 via rigid axles 328. As illustrated in FIG. 9 in particular, the axles 328 include axle shafts 302 partially surrounded by non-rotating axle tubes 304, which in turn are rigidly supported by the frame 310. As shown in particular in FIG. 6, each of the wheels 319 is secured to a hub 306 (see FIG. 9) on the associated axle shaft 302, so that the wheels 319 rotate with the axle shafts 302 via rotation of the hubs 306. In the loader 300, the wheels 319 are secured to the hubs 306 using an array of eight regularly spaced bolts 344. In other embodiments, however, other arrays of fasteners are possible (e.g., arrays of six or nine bolts, etc.).

Also, end caps 308 are attached to outboard ends of the axle shafts 302 in the illustrated embodiment. In particular, the end caps 308 are attached to the axle shafts 302 using bolts 342 that extend into threaded holes (not shown) that extend axially into the axle shaft 302, although other mechanical attachments (e.g., other arrangements of threaded fasteners) are possible. In some embodiments, as also discussed below, the use of end caps can help to improve the ease with which wheeled tractive assemblies can be replaced with tracked tractive assemblies by providing space to accept a bearing. In some embodiments, however, end caps may not be included on the relevant axles, or the axles may include end caps that are differently configured than the end caps 308 so as to be able to accept a bearing.

To convert the loader 300 from a wheeled power machine (as shown in FIG. 5) to a tracked power machine (e.g., a quad track power machine), according to some embodiments, each of the wheels 319 can be replaced with a corresponding track assembly. To accomplish this conversion, the wheels 319 can be removed from the respective hub 306 by removing the relevant bolts. With the wheels 319 thus removed, as further discussed below, the hubs 306 are available to engage components of differently configured traction assemblies, such as sprockets for track assemblies.

In some embodiments, axle hubs alone may not be sufficient (i.e., long enough) to secure replacement traction assemblies to axles of wheeled power machines. Accordingly, for example, conversion operations for a loader can also include attaching stub shafts to the relevant axles. As also discussed below, stub shafts can help to rotatably support a traction assembly on the axles (e.g., the axles 328), for relatively free pivoting about the axles, even as power is delivered from the axle shafts to corresponding tracks. In some implementations, end caps may first need to be removed from the axle shafts, to be replaced with corresponding stub shafts. However, as further discussed below, some power machines may include stub shafts that can remain in place for wheeled and tracked operation. Similarly, as noted above, some power machines may not include end caps that need to be removed before stub shafts can be installed.

Figure 7:
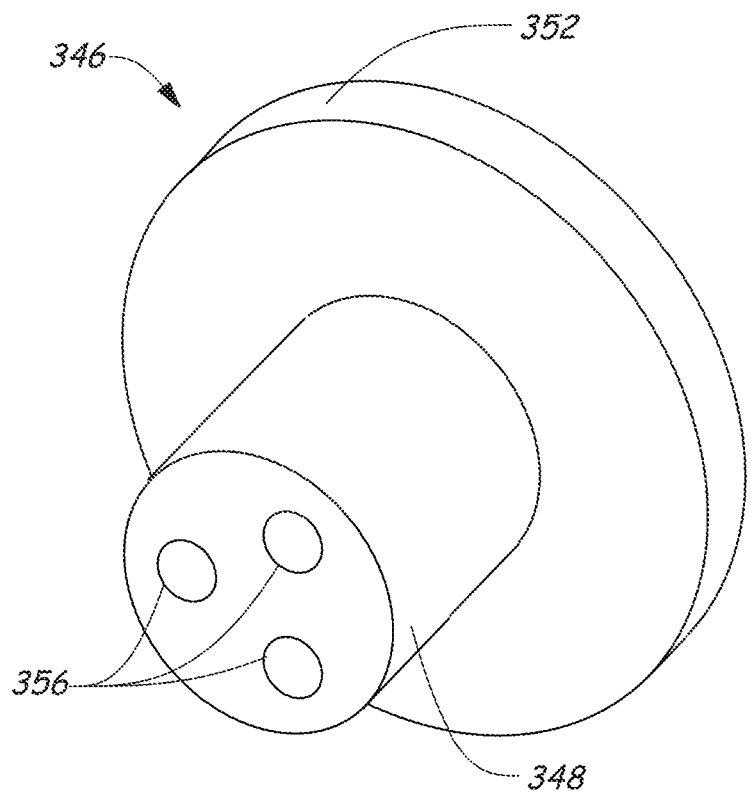
FIGS. 7 and 8 illustrate isometric views of a stub shaft for conversion of the wheel assembly of the power machine of FIG. 5 to a track assembly.
Figure 8:
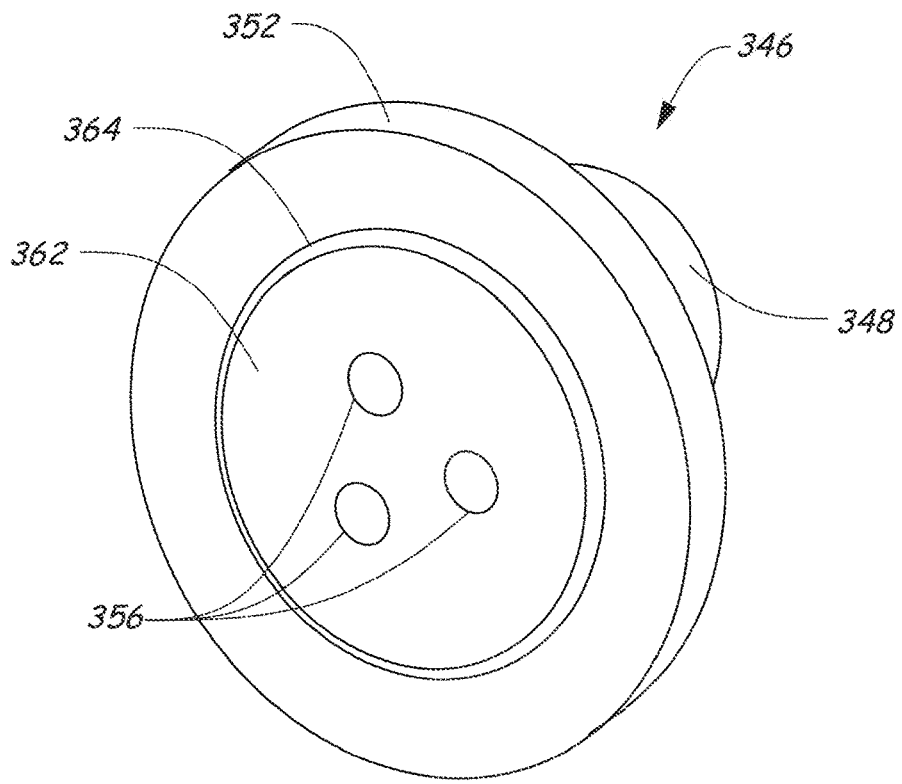

FIGS. 7 and 8 illustrate an example stub shaft 346 for use in converting the loader 300 to a quad track power machine. In particular, the stub shaft 346 includes a support shaft 348, and a cylindrical flange 352 that extends radially outward from an inboard end of the support shaft 348. As also discussed below, the support shaft 348 is generally configured to rotatably support a track assembly relative to an axle shaft, and the flange 352 is generally configured to help secure the stub shaft 346 to the axle shaft 302. In this regard, a stub shaft can sometimes include an engagement feature that is configured to engage a complementary feature on a hub to appropriately position the stub shaft relative to the axle. For example, as shown in FIGS. 7 and 8, fastener holes 356 extend axially through the stub shaft 346, and a shallow boss 362 with a shoulder 364 extends axially away from an inboard side of the flange 352. In other embodiments, however, other configurations are possible, including stub shafts with different overall profiles, differently shaped or sized flanges or support shafts, stub shafts with different features to secure the stub shafts to relevant axles, and so on.

As illustrated in FIG. 9, once the end cap 308 has been removed (as needed) from an outboard end of one of the axle shafts 302, the stub shaft 346 can be installed. In particular, in the illustrated embodiment, the stub shaft 346 can be installed on the axle shaft 302 using the same threaded holes as were used to secure the end cap 308 and, potentially, also with the same bolts 342 although longer bolts likely may be needed. Further, as installed, the boss 362 can extend partly into a corresponding and complementary recess (not shown) on the outboard end of the axle shaft 302, such that the shoulder 364 can provide further support for transverse loading of the stub shaft 346. This arrangement can provide a particularly strong engagement between the stub shaft 346 and the axle shaft 302, as well as advantageous reuse of certain components (e.g., possibly the bolts 342 and the corresponding holes), although a variety of other configurations are also possible.

In some embodiments, an axial length of a stub shaft can be selected to preserve certain aspects of an overall width or other spatial aspects of a power machine, while also providing appropriate support for a track assembly. For example, some stub shafts (e.g., the stub shaft 346) can be configured with an installed axial length (e.g., outboard extension away from an axle) that is smaller than a distance between an outboard end of the axle and a maximum outboard extent of a wheel rim (e.g., rim 319A of the wheels 319). Accordingly, such stub shafts may not extend outboard past the corresponding wheel rim when the wheel and the stub shaft are both attached to the axle. This configuration can allow some power machines to be operated with a stub shaft and wheels in place, without altering a total operational width of the power machines (e.g., as dictated by a width of an attached bucket). Correspondingly, for example, it may not be necessary to remove an end cap from an axle to install a stub shaft, as part of a conversion of a wheeled power machine to a tracked power machine, because a stub shaft can remain in place whether tracked or wheeled tractive assemblies are used.

In different embodiments, a stub shaft can be formed in different ways. For example, the stub shaft 346 is manufactured as a cast or otherwise integrally formed part, with certain machined features (e.g., the fastener holes 356). In other embodiments, however, other approaches are possible.

Figure 10:
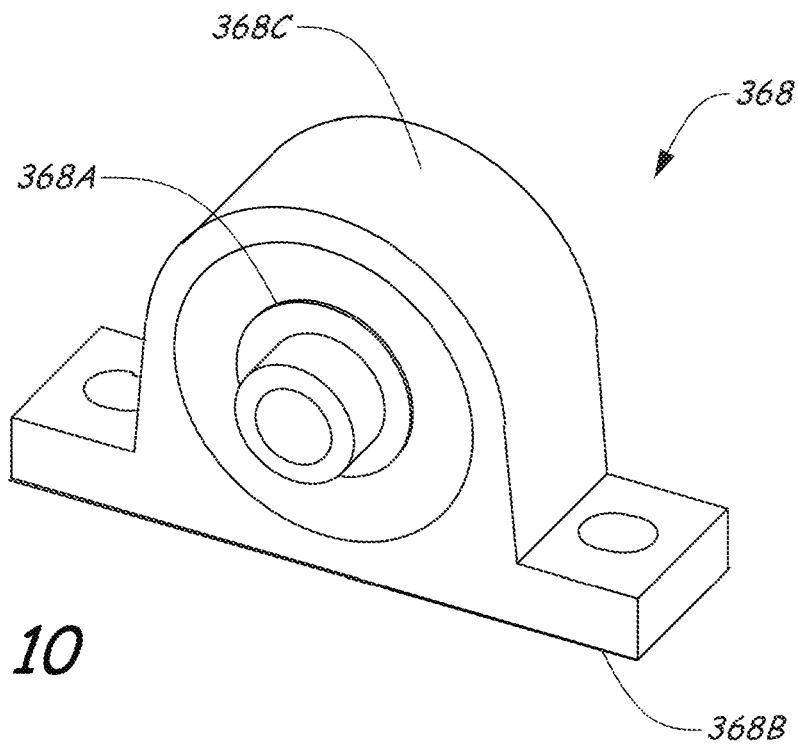
FIG. 10 illustrates a perspective view of a bearing for use with the track assembly of FIG. 9.

With a stub shaft secured to an axle, a track frame can then be rotatably secured to the axle at the stub shaft. In some embodiments, a bearing can be secured to a stub shaft and a track frame so that the track frame can advantageously pivot about the stub shaft (and the axle, generally). As also illustrated in FIG. 9, for example, a track frame 366 (e.g., formed as a welded unitary body) is rotatably secured to the stub shaft 346 with a first bearing 368. In some embodiments, first bearing 368 is a captured ball-bearing and more particularly a pillow block bearing. As illustrated in FIG. 10 in particular, the bearing 368 includes an inner bearing 368A, a mounting surface 368B, and a locking collar 368C. Thus, to install the track frame 366 to be rotatably supported by the axle 328, the inner bearing 368A can be disposed on the stub shaft 346 and secured thereon with the locking collar 3680. Other embodiments may use other structures to secure the bearing 368 on the stub shaft 346. With the mounting surface 368B secured to the track frame 366, the track frame 366 can thereby be secured to the stub shaft 346, so that the stub shaft 346 (and the axle shaft 302) can rotate freely relative to the track frame 366. Correspondingly, the track frame 366 can also be free to pivot relative to the axle 328, such as may allow effective travel over a variety of support surfaces.

Although a pillow block bearing may be particularly useful in some contexts, differently configured bearings can also provide similar rotatable support for a track assembly in other embodiments. Similarly, although the illustrated configuration of the track frame 366 may be suitable for a variety of installations, any number of differently configured track frames can be similarly installed using a stub shaft that is attached to an outboard end of an axle shaft.

In some embodiments, it may be useful to provide stops to limit a total range of pivoting movement of a track frame relative to an axle. For example, the track frame 366 or the loader frame 310 can include mechanical stops (not shown), such as pins, plates, or other rigid features, that can prevent the track frame 366 from pivoting relative to the axle 328 beyond a predetermined angular range.

In some embodiments, further structures can be provided to help rotatably support a track assembly relative to an axle, when the track assembly is installed on the axle to replace a wheel. For example, as also illustrated in FIG. 9, a second bearing 376 engages the axle tube 304 opposite the hub 306 from the bearing 368. In some embodiments, the second bearing 376 is a bushing, although it need not be the case in other embodiments. Because the embodiment shown in FIG. 9 is a bushing, the second bearing will be referred to in this discussion as a bushing to distinguish between the second bearing and the first bearing. The bushing 376 exhibits an inner diameter slightly larger than the axle tube 304. Accordingly, the bushing 376 can rotatably support the track frame 366 relative to the axle 328, in cooperation with the bearing 368. Thus, as also discussed above, the track frame 366 (and the track assembly generally) can be fully supported for load-bearing operations, while also being generally free to pivot, independently of the axle 328, about a centerline of the axle 328.

In different embodiments, different types of bearings can be used. As illustrated in FIG. 9, for example, the bushing 376 is a split bushing, with a lower portion that is integrally formed with an inboard plate of the track frame 366, and a separate upper portion that can be bolted to the lower portion to complete the bushing 376 and surround the axle tube 304. In other embodiments, however, other configurations are possible.

Before or after a track frame is attached to a corresponding stub shaft, a track can be aligned on the track frame. For example, referring again to FIG. 9, once the track frame 366 has been secured to the axle 328, a track (not shown) of any of various known configurations can be disposed around the track frame 366 and the hub 306. A sprocket (not shown in FIG. 9) can then be attached to the hub 306 and appropriately engaged with the track, so that rotation of the hub 306 via rotation of the axle shaft 302 also drives the track around the track frame 366 via rotation of the hub 306 and the sprocket. Thus, for example, a fully assembled and operational track assembly can be installed to replace a wheel of a power machine. Further, in some implementations, it may be possible to reverse the installation process discussed above, in order to replace a tracked tractive assembly (e.g., on a quad track power machine) with one or more wheels.

In some embodiments, ease of installation of a track on a track frame can be substantially improved by using a segmented sprocket. For example, although a substantially fully circular sprocket may be required to appropriately drive a track, it may be relatively difficult to attach a single-piece circular sprocket to an axle hub (e.g., the hub 306) and then establish appropriately alignment with and tensioning of an associated track. However, a segmented sprocket can include multiple sprocket pieces, which together can define an appropriate overall (e.g. fully circular) sprocket profile, but which individually extend over only a fraction of a circle and can be individually installed. Accordingly, for example, a first piece of a segmented sprocket can be attached to an axle hub, aligned with a corresponding track, then rotated (e.g., via rotation of the axle hub) to at least partly engage the track. With the track thus engaged, it may then be relatively easy to install the remaining pieces of the segmented sprocket to complete the sprocket installation and enable tracked operation of the relevant power machine.

In some embodiments, it may be advantageous to provide a segmented sprocket with at least three sprocket pieces. For example, as competing design considerations, relatively large-angle sprocket pieces may be relatively useful for appropriately engaging and tensioning a track, but relatively small-angle sprocket pieces may be relatively easy to install on a hub, particularly once other sprocket pieces are already in place on the hub. In some embodiments, a three- or four- (or more) piece segmented sprocket can provide an advantageous balance between these considerations.

Figure 11:
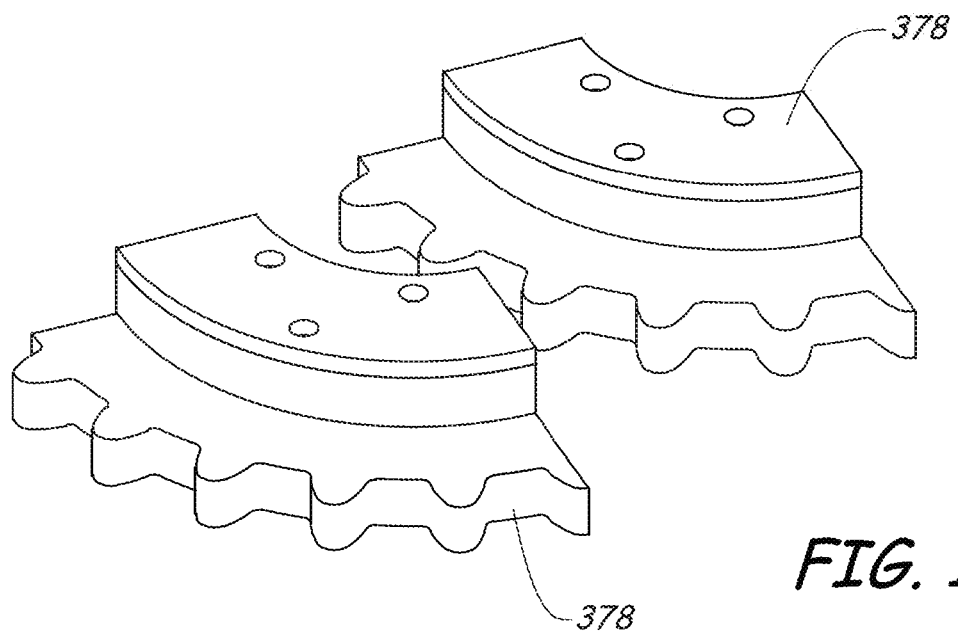
FIGS. 11 and 12 illustrate perspective and front elevation views, respectively, of sprocket pieces for a segmented sprocket according to some disclosed embodiments.
Figure 12:
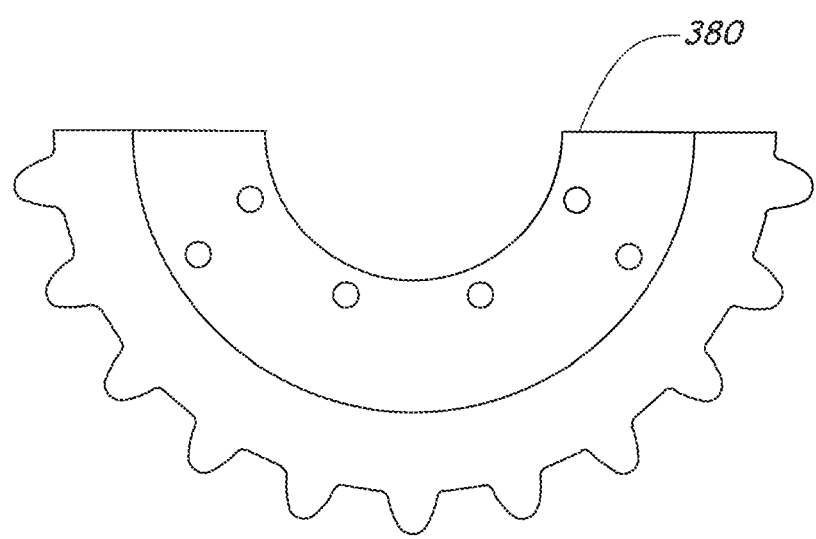

In some cases, pieces of a segmented sprocket may extend over different angular spans (i.e., different fractions of a circle). As illustrated in FIGS. 11 and 12, for example, a substantially fully circular segmented sprocket (not shown fully assembled) can be formed from a set of two quarter-circular sprocket pieces 378 (see FIG. 11) and a semi-circular sprocket piece 380 (see FIG. 12). With this arrangement, for example, the semi-circular sprocket piece 380 can be secured to the hub 306 (see FIG. 9) and the hub 306 and the sprocket piece 380 then rotated together to engage a track (not shown) over a select portion of the sprocket piece 380. With the track thus engaged by the sprocket piece 380, the quarter-circular sprocket pieces 378 can then be readily installed on the hub 306 below the sprocket piece 380. With the sprocket thus fully installed, the track can then be driven around the track frame 366 by the sprocket pieces 378, 380 to move the loader 300. In the embodiment illustrated, the sprocket pieces 378, 380 are cast metal parts with regularly spaced mounting holes to engage the bolts 344, although other configurations are also possible.

In different embodiments, a variety of configurations are possible for a segmented sprocket. For example, some embodiments can include a three-piece segmented sprocket with three substantially identical sprocket pieces (e.g., three third-circular sprocket pieces). In some embodiments, an optimal number of sprocket pieces may be partly determined based on a particular fastener array of a relevant axle hub. For example, axle hubs with mounting locations for a number of fasteners that are divisible by three may be well-suited for segmented sprockets with three substantially identical sprocket pieces (e.g., third-circular sprocket pieces). In contrast, for example, axle hubs with mounting locations for an even number of fasteners may be well-suited for segmented sprockets with half-circular or quarter-circular sprocket pieces (e.g., the sprocket pieces 378, 380).

In some embodiments, sprocket pieces may be substantially identical to each other and can be symmetrically installed (e.g., as shown for the sprocket pieces 378). This may be advantageous, for example, relative to inventory management and ease of installation. In other embodiments, however, other configurations are possible. Further, in some embodiments, wheeled power machines can be converted to tracked power machines without the use of segmented sprockets, and segmented sprockets can be advantageously used in operations other than conversions between wheeled and tracked power machines.

In some embodiments, segmented (or other) sprockets can be configured to maintain appropriate an overall width for a power machine once wheels of the power machines have been replaced with tracked tractive elements. For example, a lateral width of a sprocket (as installed) can be configured so that the sprocket teeth engage a corresponding track with the track disposed to maintain a desired overall width of the power machine. In some cases, this width can correspond to a total width of a bucket attachment, although other configurations are also possible. In some embodiments, sprockets can be configured so that the teeth of the sprocket are disposed (e.g., inset) inboard of a centerline of a tire that is replaced by the sprocket (and other components of a tracked tractive assembly). In some embodiments, a track frame can be designed based on similar considerations, such that the track frame supports a track with the track disposed to maintain a desired overall width for the power machine.

Although the present invention has been described by referring to preferred embodiments, workers skilled in the art will recognize that changes may be made in form and detail without departing from the scope of the discussion.

What is claimed is:

1. A kit for converting a wheeled power machine to a tracked power machine, the wheeled power machine including an axle with a rotating axle shaft, a hub secured to the axle shaft inboard of an outboard end of the axle shaft, and a wheel secured to the hub, the kit comprising:
 a stub shaft positionable outboard of the hub when the wheel is removed from the hub, the stub shaft configured to be secured at the outboard end of the axle shaft;
 a track frame configured to be operably coupled to the axle at the stub shaft; and
 a sprocket configured to be secured to the hub in place of the wheel to move a track about the track frame upon rotation of the axle shaft.

2. The kit of claim 1, with the axle further including a non-rotating axle tube that surrounds the axle shaft, the kit further comprising:
 a first bearing configured to engage the stub shaft and the track frame to operably couple the track frame to the axle shaft; and
 a second bearing configured to engage the axle tube and to rotatably support the track frame relative to the axle opposite and inboard the hub from the first bearing.

3. The kit of claim 2, wherein at least part of the second bearing is integrally formed with the track frame.

4. The kit of claim 1, wherein the stub shaft has an engagement feature configured to engage a complementary feature on the axle to position and support the stub shaft relative to the axle.

5. The kit of claim 4, wherein the engagement feature includes a boss configured to extend into a corresponding recess on the outboard end of the axle shaft of the axle.

6. The kit of claim 1, wherein the stub shaft is one of four substantially identical stub shafts, each configured to rotatably support a corresponding track frame relative to a corresponding axle of the wheeled power machine, to convert the wheeled power machine to a quad track power machine.

7. The kit of claim 1, wherein the sprocket includes a segmented sprocket with at least three sprocket pieces configured to collectively define a substantially circular sprocket profile;
 the at least three sprocket pieces being configured to be separately secured to the hub to be engaged with the track.

8. The kit of claim 7, wherein the segmented sprocket includes one of the following configurations:
 a first of the sprocket pieces is a semi-circular sprocket piece and a second and a third of the sprocket pieces are quarter-circular sprocket pieces; and
 each of the at least three sprocket pieces is a third-circular sprocket piece.

9. A method of converting a power machine from using wheeled tractive elements to tractive elements that each include an endless track, the method comprising:
 removing a wheel from a hub of an axle of the wheeled power machine;
 attaching a stub shaft to an outboard end of an axle shaft of the axle;
 rotatably securing a track frame to the stub shaft;
 supporting the stub shaft on the track frame with a first bearing outboard of the hub;
 supporting the axle on the track frame with a second bearing inboard of the hub;
 aligning a track on the track frame;
 attaching a sprocket to the hub inboard of the stub shaft; and
 rotating the hub to tension the track with the sprocket.

10. The method of claim 9, wherein the sprocket is a segmented sprocket including at least two sprocket pieces; and
 wherein a first of the sprocket pieces is attached to the hub and rotated to engage the track before a second sprocket piece is attached to the hub.

11. The method of claim 10, wherein the segmented sprocket includes one of the following sets of sprocket pieces:
 a semi-circular sprocket piece and two quarter-circular sprocket pieces; and
 three third-circular sprocket pieces.

12. The method of claim 9, wherein aligning the track, attaching the sprocket, and rotating the hub include:
 securing a first sprocket piece of a segmented sprocket to the hub;
 placing a track in alignment with the first sprocket piece;
 rotating the hub to tension the track with the first sprocket piece; and
 after tensioning the track with the first sprocket piece, securing second and third sprocket pieces of the segmented sprocket to the hub.

13. The method of claim 12, wherein the first sprocket piece is a semi-circular sprocket piece and the second and third sprocket pieces are quarter-circular sprocket pieces.

14. The method of claim 12, wherein each of the first, second, and third sprocket pieces are third-circular sprocket pieces.

15. The method of claim 9, further comprising:
 removing an end cap from the outboard end of the axle shaft of the axle;
 wherein the stub shaft is attached to the outboard end of the axle shaft in place of the end cap.

16. A kit for converting a wheeled power machine to a tracked power machine, the wheeled power machine including an axle with an axle shaft, a hub supported by the axle shaft, a wheel secured to the hub, and an end cap secured to fastener holes at an outboard end of the axle shaft, with a track frame being provided to replace the wheel, the kit comprising:
 a stub shaft configured to be secured at the fastener holes at the outboard end of the axle shaft, spaced outboard of the hub, in place of the end cap, the stub shaft including a support shaft and a cylindrical flange that extends radially outward from an inboard end of the support shaft, the support shaft having one or more fastener holes extending axially through the support shaft;
 the stub shaft being further configured to rotatably support the track frame relative to the axle and to be secured at the fastener holes at the outboard end of the axle using the one or more fastener holes.

17. The kit of claim 16, further comprising:
 a segmented socket configured to be secured to the hub to rotate relative to the track frame.

18. A method of converting a power machine from using wheeled tractive elements to tractive elements that each include an endless track, the method comprising:
 removing a wheel from a hub of an axle of the wheeled power machine;
 removing an end cap from an outboard end of an axle shaft of the axle;
 attaching a stub shaft to the outboard end of the axle shaft in place of the end cap;
 rotatably securing a track frame to the stub shaft;
 aligning a track on the track frame;

attaching a sprocket to the hub inboard of the stub shaft; and rotating the hub to tension the track with the sprocket.

19. A method of converting a power machine from using wheeled tractive elements to tractive elements that each include an endless track, the method comprising:

removing a wheel from a hub of an axle of the wheeled power machine;

attaching a stub shaft to an outboard end of an axle shaft of the axle;

rotatably securing a track frame to the stub shaft;

aligning a track on the track frame;

attaching a sprocket to the hub inboard of the stub shaft; and rotating the hub to tension the track with the first sprocket piece;

wherein aligning the track, attaching the sprocket, and rotating the hub include:

securing a first sprocket piece of a segmented sprocket to the hub;

placing a track in alignment with the first sprocket piece;

rotating the hub to tension the track with the first sprocket piece; and after tensioning the track with the first sprocket piece, securing second and third sprocket pieces of the segmented sprocket to the hub.

\* \* \* \* \*